(12) United States Patent
Okuyama et al.

(10) Patent No.: US 8,770,475 B2
(45) Date of Patent: Jul. 8, 2014

(54) SYSTEM AND METHOD FOR SETTING CONNECTION BETWEEN INFORMATION PROCESSING DEVICES, COMMUNICATION APPARATUS, SETTING INFORMATION IDENTIFIER OUTPUTTING APPARATUS, AND COMPUTER PROGRAM

(75) Inventors: Yoshiaki Okuyama, Tokyo (JP); Takuya Murakami, Tokyo (JP); Yasushi Hikichi, Tokyo (JP); Masahito Shinohara, Tokyo (JP)

(73) Assignees: NEC Corporation, Tokyo (JP); NEC Display Solutions, Ltd., Tokyo (JP)

( * ) Notice: Subject to any disclaimer, the term of this patent is extended or adjusted under 35 U.S.C. 154(b) by 64 days.

(21) Appl. No.: 13/504,002

(22) PCT Filed: Nov. 2, 2010

(86) PCT No.: PCT/JP2010/069485
§ 371 (c)(1),
(2), (4) Date: Apr. 25, 2012

(87) PCT Pub. No.: WO2011/052778
PCT Pub. Date: May 5, 2011

(65) Prior Publication Data
US 2012/0211559 A1 Aug. 23, 2012

(30) Foreign Application Priority Data

Nov. 2, 2009 (JP) .............................. P2009-252250

(51) Int. Cl.
*G06Q 40/00* (2012.01)
(52) U.S. Cl.
USPC ........................................................ 235/379
(58) Field of Classification Search
USPC ........................................................ 235/379
See application file for complete search history.

(56) References Cited

U.S. PATENT DOCUMENTS

2008/0039063 A1* 2/2008 Ichieda .......................... 455/420
2012/0036226 A1* 2/2012 Chor .............................. 709/219

FOREIGN PATENT DOCUMENTS

| JP | 2004-086492 A | 3/2004 |
| JP | 2005-347981 A | 2/2005 |
| JP | 2007-102562 A | 4/2007 |
| JP | 2007-312179 A | 11/2007 |
| JP | 2007-324926 A | 12/2007 |

OTHER PUBLICATIONS

International Search Report in PCT/JP2010/069485 dated Dec. 21, 2010(English Translation Thereof).

* cited by examiner

*Primary Examiner* — Kristy A Haupt
(74) *Attorney, Agent, or Firm* — McGinn IP Law Group, PLLC (57) ABSTRACT

A system for setting a connection between information processing devices, according to the present invention includes: a server apparatus which is arranged on a network, collectively manages setting information necessary for a connection between other devices, and distributes requested setting information according to a request from another apparatus; and a communication apparatus which transmits information to the server apparatus. The communication apparatus includes: a first reading unit which makes displayed or printed code information readable, the code information indicating a location of setting information necessary for a connection to another device; a second reading unit which reads the code information; a converting unit which converts the code information into the location of the setting information; an acquiring unit which acquires the setting information from the location of the setting information; and a connection setting unit which performs a connection setting based on the setting information.

16 Claims, 4 Drawing Sheets

SYSTEM AND METHOD FOR SETTING CONNECTION BETWEEN INFORMATION PROCESSING DEVICES, COMMUNICATION APPARATUS, SETTING INFORMATION IDENTIFIER OUTPUTTING APPARATUS, AND COMPUTER PROGRAM

TECHNICAL FIELD

The present invention relates to a system for setting a connection between information processing devices, a communication apparatus, a setting information identifier outputting apparatus, a method of setting a connection between information processing devices, and a computer program.

BACKGROUND ART

Recently, information processing devices such as PCs (personal computers) have come into wide use. Accordingly, one pattern of use frequently seen involves a large group of people holding a conference in which a video held on a PC is displayed by connecting the PC to an image display apparatus such as a projector.

In a conference in which a plurality of persons participate, work becomes complex because each participant needs to re-connect a cable to a PC every time a user or owner of a projector changes. Thus, a pattern of use in which a communication connection between the PC and the projector is made by a wireless communication means in which wiring is unnecessary may be desirable.

However, in a connection method based on a wireless communication standard such as a wireless LAN (local area network) or Bluetooth, a setting procedure becomes complex because a number of connection setting operations are necessary in preparation for security, interference, and the like. For example, connection information for a communication connection to a projector via a wireless LAN includes an IP address of the projector, a plurality of identifiers, a passphrase in WPA (Wi-Fi protected access), which is encryption technology of communication data, and the like. The plurality of identifiers are an ESSID (extended service set identifier) indicating the name of a connecting access point, and the like.

In order to set a connection between information processing devices, for example, when a projector is used, connection information of the projector should be examined in advance. In addition, it is difficult for someone having no knowledge about network setting to perform setting correctly even when connection information is identified in advance.

Furthermore, at present, a number of portable terminal apparatuses such as a portable phone, a game machine, a PDA (personal digital assistant), and the like, on which a wireless communication apparatus has been mounted, have been commercialized. In particular, there is a need for a method of inputting data for presentation to a portable phone, a PDA, or the like to visit a partner company and performing the presentation using only the portable terminal apparatus and the projector in the partner company when there are constraints on carrying a PC.

To solve the above-described problem, in technology disclosed in Patent Document 1, connection information for accessing an access point is widely distributed a wireless LAN spot using a wireless LAN to general users in advance via an information distribution medium. In this case, a user who desires to establish a connection to the wireless LAN spot by reading information for the connection using a mobile communication terminal apparatus.

In technology disclosed in Patent Document 2 technology for easily accessing one electronic device from another electric device is disclosed. That is, an image display system disclosed in Patent Document 2 generates a connection information code by converting connection information necessary for accessing a projector in a wireless LAN into a two-dimensional code, and projects the connection information code to the projector. In this case, if the connection information code is imaged by an imaging unit, a portable terminal apparatus analyzes an image including the imaged connection information code and extracts the connection information. Then, the projector corresponding to the wireless LAN is accessed using the extracted connection information.

PRIOR ART DOCUMENTS

Patent Documents

[Patent Document 1] Japanese Unexamined Patent Application, First Publication No. 2005-347981
[Patent Document 2] Japanese Unexamined Patent Application, First Publication No. 2007-312179

SUMMARY OF THE INVENTION

Problem to be Solved by the Invention

However, a procedure in which a user inputs wireless LAN connection setting information becomes complex as described above if a current wireless LAN spot system is used for connection setting between the existing communication apparatus and the information processing device described in the above-described background art. Thus, the use of a wireless LAN spot service is restrained and its improvement is necessary. In the technologies disclosed in the above-described Patent Documents 1 and 2 for such a problem, setting information, which is embedded, for example, in a bar code, is displayed on an information distribution medium or projector, and the setting information is read and automatically input to the information processing apparatus such as a computer. Because the setting information is directly embedded in the bar code or the like in this way, the setting information cannot change once it is generated. In addition, when an increase in the amount of setting information is desired, all setting information is not embedded in the bar code or the like. Further, when there is confidential information, the information is likely to be leaked if the information is embedded in the bar code or the like.

The present invention has been made in view of the above-described problems. For example, an exemplary object of the present invention is to provide a system for setting a connection between information processing devices, a communication apparatus, a setting information identifier outputting apparatus, and a method of setting a connection between information processing devices, which can handle a setting information change or an increase in the amount of setting information, and solve a problem of setting information being leaked when the setting information is distributed as an image.

Means for Solving the Problem

A system for setting a connection between information processing devices, according to a first exemplary aspect of the present invention includes: a server apparatus which is arranged on a network, collectively manages setting information necessary for a connection between other devices, and distributes requested setting information according to a request from another apparatus; and a communication apparatus which transmits information to the server apparatus. The communication apparatus includes: a first reading unit which makes displayed or printed code information readable, the code information indicating a location of setting information necessary for a connection to another device; a second reading unit which reads the code information; a converting unit which converts the code information into the location of the setting information; an acquiring unit which acquires the setting information from the location of the setting information; and a connection setting unit which performs a connection setting based on the setting information.

A communication apparatus according to a second exemplary aspect of the present invention includes: a reading unit which reads code information indicating a location of setting information necessary for a connection to another device; a converting unit which converts the code information into the location of the setting information; an acquiring unit which acquires the setting information from the location of the setting information; and a connection setting unit which performs a connection setting based on the acquired setting information.

A setting information identifier outputting apparatus according to a third exemplary aspect of the present invention includes: a database unit which stores setting information necessary for a connection between other devices; an inputting unit which inputs the setting information; a generating unit which generates code information indicating a location of the setting information; an outputting unit which outputs the code information; and a setting transmitting unit which transmits the setting information to an external server apparatus collectively managing the setting information.

A method of setting a connection between information processing devices, according to a fourth exemplary aspect of the present invention includes the steps of: reading code information indicating a location of setting information necessary for a connection to another device; converting the code information into the location of the setting information; acquiring the setting information from the location of the setting information; and performing a connection setting based on the acquired setting information.

A method of setting a connection between information processing devices, according to a fifth exemplary aspect of the present invention includes the steps of: storing setting information necessary for a connection between other devices; inputting the setting information; generating code information indicating a location of the setting information; outputting the code information; and transmitting the setting information to an external server apparatus collectively managing the setting information.

A computer program for causing a computer to execute connection setting with another device, according to a sixth exemplary aspect of the present invention includes the steps of: reading code information indicating a location of setting information necessary for a connection to another device; converting the code information into the location of the setting information; acquiring the setting information from the location of the setting information; and performing a connection setting based on the acquired setting information.

A computer program for causing a computer to execute setting for connection between information processing devices, according to a seventh aspect of the present invention includes the steps of: inputting setting information necessary for a connection between other devices; generating code information indicating a location of the setting information; outputting the code information; and transmitting the setting information to an external server apparatus collectively managing the setting information.

Effect of the Invention

According to the present invention, it is possible to handle a setting information change or an increase in the amount of setting information and reduce the possibility of setting information leakage when setting information is distributed as an image.

EMBODIMENTS FOR CARRYING OUT THE INVENTION

Hereinafter, a system for setting a connection between information processing devices, a communication apparatus, a method of setting a connection between information processing devices, and a computer program according to exemplary embodiments of the present invention will be described in detail with reference to the drawings.

In description of each of the exemplary embodiments of the present invention, the system for setting the connection between the information processing devices and the communication apparatus will be described in detail. Computer programs according to the exemplary embodiments of the present invention are programs to be implemented as each component included in the system for setting the connection between the information processing devices and the communication apparatus. Therefore, a description regarding the programs is included in the following description.

First Exemplary Embodiment

A system for setting a connection between information processing devices (or a connection setting apparatus) according to the first exemplary embodiment of the present invention includes a communication apparatus and a setting information distribution apparatus. The communication apparatus has a means for reading URI (universal resource identifier) information for the setting information distribution apparatus distributed by an information distribution medium distributing information widely.

The medium is such as printed material or an image display apparatus. The setting information includes a bar code or character. The read means has a function of reading the bar code or character.

The communication apparatus has a means for reading setting information from a server corresponding to a URI using the setting information.

Figure 1:
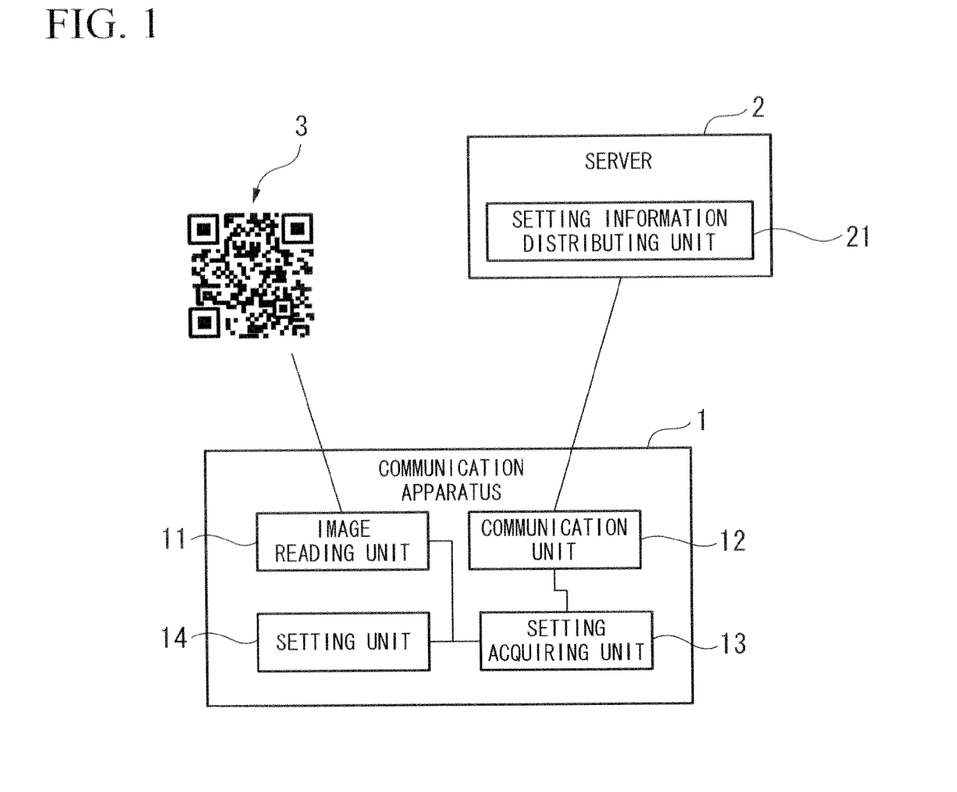
FIG. 1 is a configuration diagram illustrating the entire configuration of a system for setting a connection between information processing devices according to a first exemplary embodiment of the present invention.

FIG. 1 is a configuration diagram illustrating the entire configuration of the system for setting the connection between the information processing devices according to the first exemplary embodiment of the present invention.

As illustrated in FIG. 1, the system for setting the connection between the information processing devices includes a communication apparatus 1 (a communication apparatus according to the exemplary embodiment of the present invention), a bar code 3, and a server 2.

The communication apparatus 1 includes an image reading unit 11 (a reading unit, a first reading unit, a second reading unit, and a converting unit), a communication unit 12 (a transmitting unit), a setting acquiring unit 13 (an acquiring unit), and a setting unit 14 (a connection setting unit).

The server 2 includes a setting information distributing unit 21, which distributes requested setting information.

In general, the bar code 3 is a two-dimensional code, for example, which may be a bar code or a QR code (a matrix type two-dimensional code).

The communication apparatus 1 can be connected to a network such as the Internet via the communication unit 12. The communication unit 12 may be a wired connection means such as a LAN (Local Area Network), or a wireless connection means defined in IEEE 802.11 wireless LAN standard.

The image reading unit 11 reads an image (here, the bar code 3) and analyzes its information. The image reading unit 11 may read character information such as in an optical character recognition (OCR) apparatus, for example. The image reading unit 11 may acquire information by reading a bar code or a QR code. In this exemplary embodiment, the image reading unit 11 reads a URI written to the QR code.

The setting acquiring unit 13 acquires data regarding connection setting based on the information read by the image reading unit 11. For example, the setting acquiring unit 13 is a type of HTTP (HyperText Transfer Protocol) client, and can download information regarding setting by establishing a connection to the server 2 by means of an HTTP protocol.

The setting unit 14 performs connection setting for connecting the communication apparatus 1 to another device (for example, a projector) using the information acquired by the setting acquiring unit 13.

Here, the bar code 3 is the QR code to which the URI necessary for acquiring setting information is written as described above. The bar code 3 may be printed on a medium such as paper, or displayed on an image display apparatus such as a display apparatus or a projector apparatus.

The server 2 is a user for distributing the setting information. Although the server 2 is generally a web server, it may be another type of server such as a FTP (file transfer protocol) server.

The setting information distributing unit 21 distributes setting information of the communication apparatus 1. The setting information is, for example, setting information necessary for a connection to the wireless LAN or use restriction information of a terminal apparatus (such as camera use prohibition). The setting information may include all information regarding connection setting with another device (terminal apparatus). Alternatively, the setting information may be software itself for performing the setting of the terminal apparatus. The setting information distributing unit 21 may pre-store the setting information, or it may dynamically generate the setting information according to an acquisition request from the communication apparatus 1.

(Description of Operation)

Figure 2:
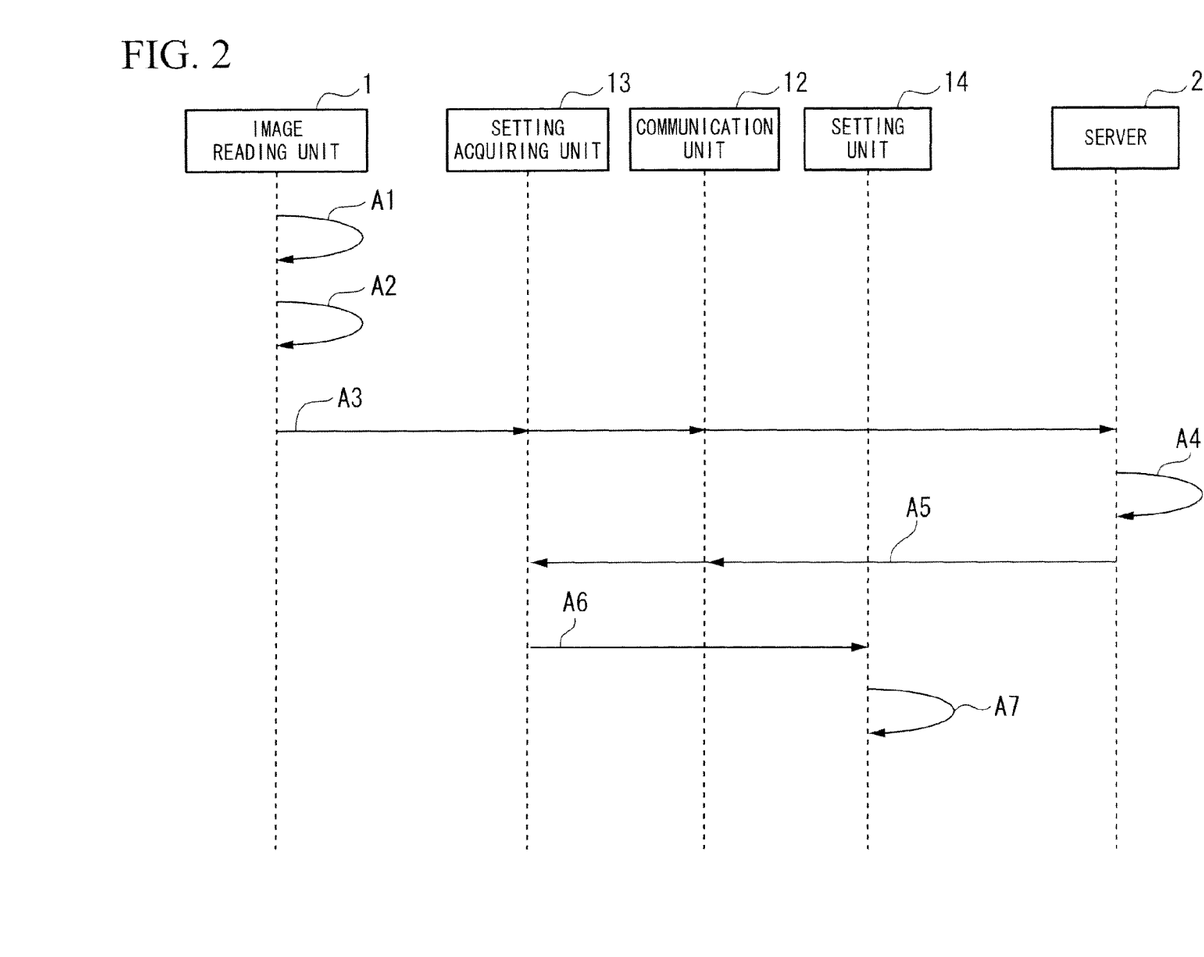
FIG. 2 is a sequence chart diagram illustrating a connection setting procedure of the system for setting the connection between the information processing devices according to the first exemplary embodiment of the present invention.

FIG. 2 is a sequence chart diagram illustrating a connection setting procedure of the system for setting the connection between the information processing devices according to the first exemplary embodiment of the present invention.

Hereinafter, a connection setting procedure of the system for setting the connection between the information processing devices according to this exemplary embodiment will be described using the sequence chart diagram illustrated in FIG. 2 with reference to FIG. 1.

(Step A1: Bar Code Read)

First, in step A1 a user reads the bar code 3 using the image reading unit 11 of the communication apparatus 1.

(Step A2: URL Acquisition)

Next, in step A2, the image reading unit 11 analyzes content of the bar code 3 and acquires a URI for acquiring setting information.

(Step A3: Setting Information Acquisition)

Next, in step A3, the communication apparatus 1 instructs the setting acquiring unit 12 to establish a connection to a designated URI and start the acquisition of setting information. For example, it is assumed that the URI is described as "http://deploy-server.example.com/someconfig.xml" and "deploy-server.example.com" within it indicates the server 2. Thereby, the setting acquiring unit 13 instructs the communication unit 12 to establish a connection to the server 2 using the HTTP protocol and request it to acquire setting information by transmitting the above-described URI.

(Step A4: Setting Information Acquisition)

Next, in step A4, the server 2 receives the above-described information acquisition request. More specifically, the server 2 instructs the setting information distributing unit 21 to acquire the setting information.

(Step A5: Setting Information Return)

Next, in step A5, the server 2 transmits a response including the acquired setting information to the communication apparatus 1. At this time, the server 2 can perform any terminal apparatus authentication (a user/password, for example). The server 2 can use an encrypted communication channel of HTTPS or the like. In the example of the above-described URI, the URI indicates an XML (eXtensible Markup Language) file in which setting information is retained, and the setting information distributing unit 21 returns the XML file statically stored on a storage provided in the server 2.

For example, it is possible o configure a URI like "http://deploy-server.example.com/cgi-bin/getconfig.cgi?paramer=abcde" and return the setting information by starting up CGI (common gateway interface) software on the setting information distributing unit 21. In this case, the setting information distributing unit 21 dynamically generates the setting information by starting up the CGI software and returns the generated setting information. An arbitrary parameter (in this example, parameter=abcde) can be optionally assigned to this CGI, and, using the information, the CGI can dynamically generate the setting information.

For example, the URI may indicate a setting application as in "http://deploy-server.example.com/getconfig.exe." In this case, the setting information distributing unit 21 may return the setting application.

In any case, the server 2 returns a type of setting information along with the setting information. Specifically, the type is included and transmitted in a header of "Content-type:" of an HTTP response. For example, in the case of the XML file it is designated as "Content-type: application/xml", and in the case of a setting application (an exe file of an OS (Operating System) it is designated as "Content-type: application/exe."

(Step A6: Setting Information)

Next, in step A6, when the communication apparatus 1 receives the setting information, it delivers the information to the setting unit 14.

(Step A7: Setting)

Next, in step A7, the setting unit 14 performs the setting of the communication apparatus 1 according to a type of the setting information. For example, if the setting information is setting information of an XML format, the setting is performed while individual setting information is extracted by performing XML analysis. If the setting information is a setting application, the setting unit 4 starts up the application and carries out a setting operation.

In the system for setting the connection between the information processing devices according to this exemplary embodiment, it has an effect that a setting information request can be sent to the server 2 and the server 2 can distribute it to a requesting source, even when the setting information dynamically changes without changing information such as a once created QR code, since only a URI necessary for downloading setting information is written to a QR code according to the above-described configuration.

In addition, in the QR code or the like, an amount of data capable of being encoded as an image is limited (to about several tens to hundreds of characters). However, since setting acquisition can be performed in a separate path in this system, it has an effect that it is possible to acquire or distribute the setting information using a QR code even when an amount of setting information is large.

Further, when the setting information is distributed from the server 2 to the requesting source, the server 2 can distribute the information after performing user authentication. Thus, it has an effect that it is possible to prevent information from being leaked due to all confidential information such as a wireless LAN password being embedded in a QR code.

Second Exemplary Embodiment

A setting information identifier outputting apparatus according to the second exemplary embodiment of the present invention displays a setting information identifier as image information, for example, on a display device, a projector, and the like including a television, a CRT/liquid crystal, and the like.

Figure 3:
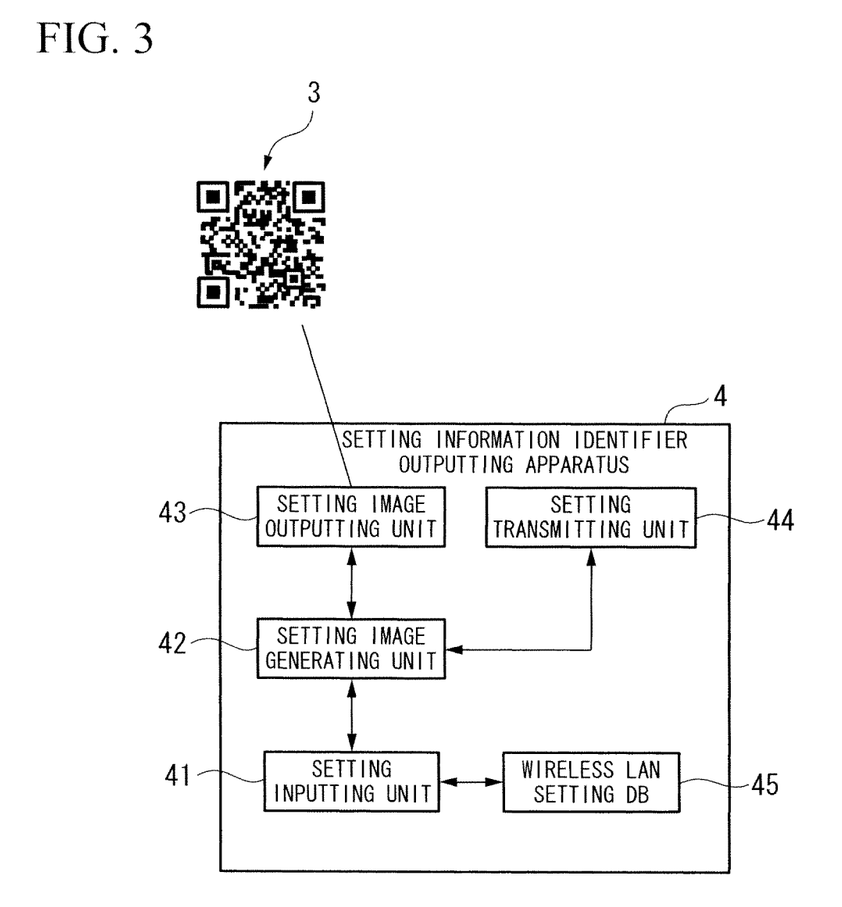
FIG. 3 is a configuration diagram illustrating the entire configuration of a setting information identifier outputting apparatus according to a second exemplary embodiment of the present invention.

FIG. 3 is a configuration diagram illustrating the entire configuration of the setting information identifier outputting apparatus according to the second exemplary embodiment of the present invention.

As illustrated in FIG. 3, the setting information identifier outputting apparatus 4 according to this exemplary embodiment includes a setting inputting unit 41 (an inputting unit), a setting image generating unit 42 (a generating unit), a setting image outputting unit 43 (an outputting unit), a setting transmitting unit 44, and a wireless LAN setting DB (database) 45 (a DB unit).

The setting information identifier outputting apparatus 4 is a device which outputs a setting information identifier of image information to a display device, a projector, and the like including a television, a CRT/liquid crystal, and the like, for example.

The setting inputting unit 41 inputs setting information. Various methods may be considered as a method of inputting the setting information. For example, the setting information may be input by a keyboard input. When the setting information identifier outputting apparatus 4 is capable of a wireless LAN connection, the setting information may be extracted from the wireless LAN setting database of the setting information identifier outputting apparatus 4 and input. The setting information may be written to a specific site on the Internet and the setting may be downloaded and input from the site.

The setting image generating unit 42 converts a URI of a server in which the setting information is placed into the bar code 3.

The setting image outputting unit 43 outputs the bar code 3 to a screen in an image display apparatus such as a display apparatus or a projector apparatus.

The setting transmitting unit 44 transmits the setting information to a server indicated by the URI.

The wireless LAN setting DB 45 is a database which stores the setting information.

(Description of Operation)

Figure 4:
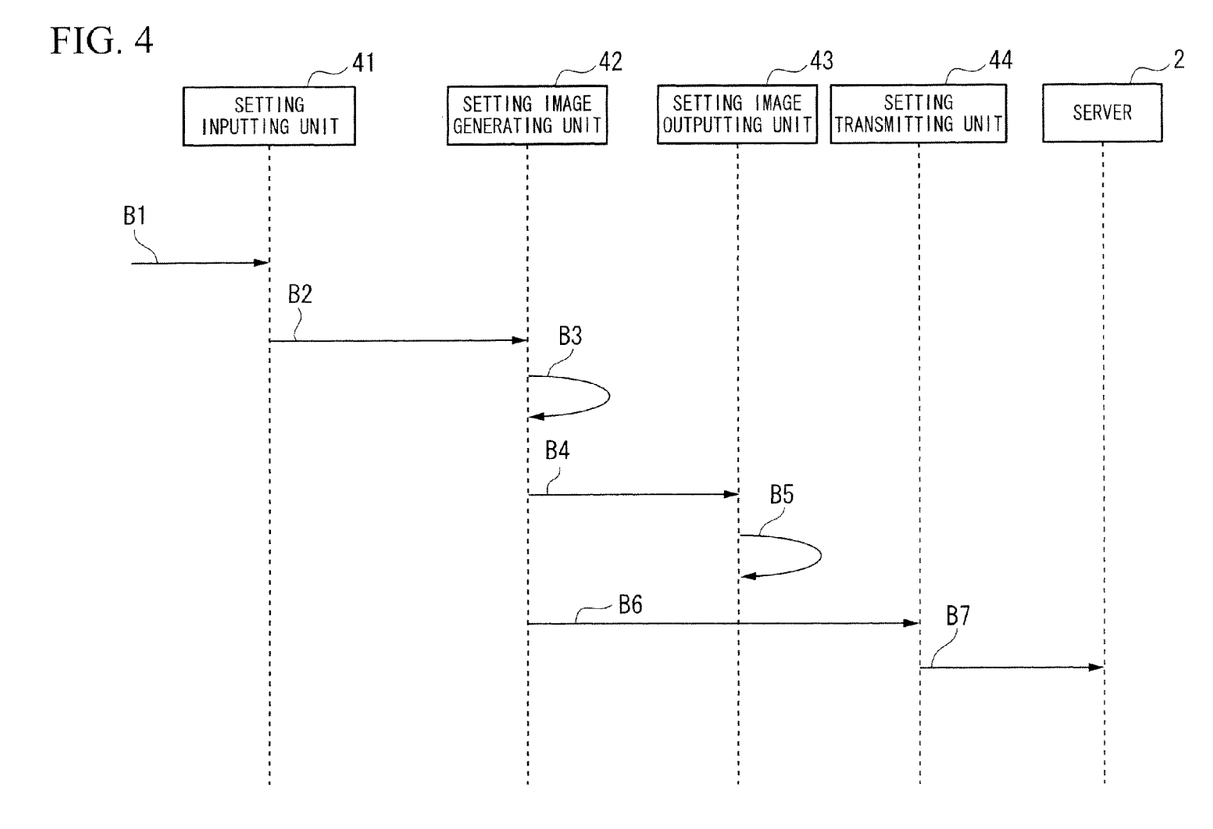
FIG. 4 is a sequence chart diagram illustrating an output processing procedure of a setting information identifier by the setting information identifier outputting apparatus according to the second exemplary embodiment of the present invention.

FIG. 4 is a sequence chart diagram illustrating an output processing procedure of a setting information identifier by the setting information identifier outputting apparatus according to the second exemplary embodiment of the present invention.

Hereinafter, the output processing procedure of the setting information identifier by the setting information identifier outputting apparatus according to this exemplary embodiment will be described using the sequence chart diagram illustrated in FIG. 4 with reference to FIG. 3.

(Step B1: Setting Information Input)

First, in step B1, the setting inputting unit 41 reads wireless LAN setting information from the wireless LAN setting DB 45 of the setting information identifier apparatus 4.

(Step B2: Setting Identifier-Encoded Image Generation Request)

Next, in step B2, the setting inputting unit 41 delivers the wireless LAN setting information read from the wireless LAN setting DB 45 to the setting image generating unit 42.

(Step B3: Encoding Into Bar Code)

In step B3, the setting image generating unit 42 specifies a URI of one server (not illustrated) in which wireless LAN setting information is placed, and converts it into the bar code 3. In this case, although only one URI of the server is assumed to be retained (embedded) in the setting image generating unit 42, it is not limited thereto. For example, a URI (that is, a server) may change for each piece of setting information described above.

(Step B4: Setting Identifier-Encoded Image Output Request)

Next, in step B4, the setting image generating unit 42 requests the setting image outputting unit 43 to output the generated bar code 3.

(Step B5: Image Output)

In step B5, the setting image outputting unit 43 outputs the bar code 3.

(Step B6: Setting Transmission Request)

Next, in step B6, the setting image generating unit 42 requests the setting transmitting unit 44 to transmit the setting information to the above-described server, which functions to collectively manage the wireless LAN connection setting information.

(Step B7: Setting Transmission)

In step B7, the setting transmitting unit 44 transmits the wireless LAN connection setting information to the above-described server.

Thereby, the above-described server can input the wireless LAN connection setting information to its own wireless LAN connection setting information database. In addition, the user can acquire the above-described wireless LAN connection setting information by reading the bar code 3, converting it into a URL of the above-described server, and accessing the above-described server.

In step B7 described above, the setting transmitting unit 44 may be configured to transmit information in which the wireless LAN connection setting information and the above-described bar code 3 are associated with each other. In this way, the above-described server an acquire the wireless LAN connection setting information to its own wireless LAN connection setting information database in association with the above-described bar code 3. In addition, the user can obtain the wireless LAN connection setting information corresponding to the bar code 3 from the above-described server as a response by reading the bar code 3, converting it into a URL of the above-described server, and transmitting the bar code 3 to the above-described server.

According to the above-described configuration, the setting information identifier outputting apparatus according to this exemplary embodiment writes only a URI necessary for downloading setting information to a bar code. Thus, it has an effect that it is possible to distribute the setting information without changing once information such as a bar code created on a medium such as a print material even when the setting information dynamically changes.

In addition, in the case of a bar code or the like, an amount of data capable of being encoded as an image is limited (to about several tens to hundreds of characters). However, since setting acquisition can be performed in a separate path in this system, it has an effect that it is possible to distribute the setting information using the bar code even when an amount of setting information is large.

Further, it is possible to acquire confidential information in a separate path and include any authentication or encryption procedure on this occasion. Thus, it has an effect that it is possible to securely distribute setting information even without embedding confidential information in a bar code or the like when the setting information is distributed.

At least part of a process of each component of the communication apparatus 1 according to the exemplary embodiment of the present invention may be executed by computer control. Further, a program for causing a computer to execute the above-described process according to the procedure illustrated in the sequence chart of FIG. 2 may be distributed by storing it in a computer-readable recording medium such as a semiconductor memory, a CD-ROM, or a magnetic tape. Computers which includes, as their category, at least a microcomputer, a personal computer, and a general-purpose computer may read the above-described program from the above-described recording medium and execute it.

At least part of a process of each component of the setting information identifier outputting apparatus 4 according to the exemplary embodiment of the present invention may be executed by computer control. Further, a program for causing a computer to execute the above-described process according to a procedure illustrated in the sequence chart of FIG. 4 may be distributed by storing it in a computer-readable recording medium such as a semiconductor memory, a CD-ROM, or a magnetic tape. Computers which includes, as their category, at least a microcomputer, a personal computer, and a general-purpose computer in the category may read the above-described program from the above-described recording medium and execute it.

This application is based upon and claims the benefit of priority from Japanese Patent Application No. 2009-252250, filed Nov. 2, 2009, the disclosure of which is incorporated herein in its entirety by reference.

INDUSTRIAL APPLICABILITY

The system for setting the connection between the information processing devices and the communication apparatus 1 according to the present invention are available when the connection is set between the information processing devices, and more particularly, are preferably available to set connections between a portable information terminal apparatus using a wireless LAN and various information processing devices.

DESCRIPTION OF REFERENCE SYMBOLS

1 Communication apparatus (communication apparatus according to an exemplary embodiment of the present invention)
2 Server
3 Bar code
4 Setting information identifier outputting apparatus
11 Image reading unit
12 Communication unit
13 Setting acquiring unit
14 Setting unit
21 Setting information distributing unit
41 Setting inputting unit
42 Setting image generating unit
43 Setting image
44 Setting transmitting unit

The invention claimed is:

1. A system for setting a connection between information processing devices, the system comprising: a server apparatus which is arranged on a network, collectively manages setting information necessary for a connection between other devices, and distributes requested setting information according to a request from another apparatus; and a communication apparatus which transmits information to the server apparatus, the communication apparatus comprising:
   a first reading unit which makes displayed or printed code information readable, the code information indicating a location of setting information necessary for a connection to another device;
   a second reading unit which reads the code information;
   a converting unit which converts the code information into the location of the setting information;
   an acquiring unit which acquires the setting information from the location of the setting information; and
   a connection setting unit which performs a connection setting based on the setting information,
   wherein information of the location indicated by the code information is URI (universal resource identifier) information of a storage location provided in the server apparatus, or URI information of the server apparatus.

2. The system for setting a connection between information processing devices according to claim 1, wherein the code information is information in which the URI information is encoded into image information.

3. The system for setting a connection between information processing devices according to claim 2, wherein the communication apparatus further comprises: a transmitting unit which transmits the setting information to the server apparatus.

4. The system for setting a connection between information processing devices according to claim 1, wherein the communication apparatus further comprises: a transmitting unit which transmits the setting information to the server apparatus.

5. A system for setting a connection between information processing devices, the system comprising: a server apparatus which is arranged on a network, collectively manages setting information necessary for a connection between other devices, and distributes requested setting information according to a request from another apparatus; and a communication apparatus which transmits information to the server apparatus, the communication apparatus comprising:
- a first reading unit which makes displayed or printed code information readable, the code information indicating a location of setting information necessary for a connection to another device;
- a second reading unit which reads the code information;
- a converting unit which converts the code information into the location of the setting information;
- an acquiring unit which acquires the setting information from the location of the setting information; and
- a connection setting unit which performs a connection setting based on the setting information,
- wherein the code information is URI information of a storage location where setting software provided in the server apparatus is stored, or URI information of the server apparatus.

6. The system for setting a connection between information processing devices according to claim 5, wherein the code information is information in which the URI information is encoded into image information.

7. The system for setting a connection between information processing devices according to claim 5, wherein the communication apparatus further comprises: a transmitting unit which transmits the setting information to the server apparatus.

8. A communication apparatus comprising:
- a reading unit which reads code information indicating a location of setting information necessary for a connection to another device;
- a converting unit which converts the code information into the location of the setting information;
- an acquiring unit which acquires the setting information from the location of the setting information; and
- a connection setting unit which performs a connection setting based on the acquired setting information,
- wherein information of the location indicated by the code information is URI (Universal Resource Identifier) information of a storage location where the setting information placed on a network is stored, or URI information of a server apparatus retaining the setting information.

9. The communication apparatus according to claim 8, wherein the code information is information in which the URI information is encoded into image information.

10. A communication apparatus comprising:
- a reading unit which reads code information indicating a location of setting information necessary for a connection to another device;
- a converting unit which converts the code information into the location of the setting information;
- an acquiring unit which acquires the setting information from the location of the setting information; and
- a connection setting unit which performs a connection setting based on the acquired setting information,
- wherein the code information is URI information of a storage location where setting software placed on a network is stored, or URI information of a server apparatus retaining the setting software.

11. The communication apparatus according to claim 10, wherein the code information is information in which the URI information is encoded into image information.

12. A setting information identifier outputting apparatus comprising:
- a database unit which stores setting information necessary for a connection between other devices;
- an inputting unit which inputs the setting information;
- a generating unit which generates code information indicating a location of the setting information; an outputting unit which outputs the code information; and
- a setting transmitting unit which transmits the setting information to an external server apparatus collectively managing the setting information.

13. The setting information identifier outputting apparatus according to claim 12, wherein information of the location indicated by the code information is URI (Universal Resource Identifier) information of a storage location where the setting information placed on a network is stored, or URI information of a server apparatus retaining the setting information.

14. The setting information identifier outputting apparatus according to claim 13, wherein the code information is information in which the URI information is encoded into image information.

15. The setting information identifier outputting apparatus according to claim 12, wherein the code information is URI information of a storage location where setting software placed on a network is stored, or URI information of a server apparatus retaining the setting software.

16. The setting information identifier outputting apparatus according to claim 15, wherein the code information is information in which the URI information is encoded into image information.

* * * * *